(12) United States Patent
Khalaj Amineh et al.

(10) Patent No.: US 12,460,533 B2
(45) Date of Patent: Nov. 4, 2025

(54) TOOL AND METHOD TO MAKE HIGH RESOLUTION AND HIGH PENETRATION MEASUREMENT OF CORROSION

(71) Applicant: Halliburton Energy Services, Inc., Houston, TX (US)

(72) Inventors: Reza Khalaj Amineh, Houston, TX (US); Burkay Donderici, Pittsford, NY (US); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/340,318

(22) Filed: Jun. 7, 2021

(65) Prior Publication Data
US 2021/0293137 A1 Sep. 23, 2021

Related U.S. Application Data

(63) Continuation of application No. 15/533,961, filed as application No. PCT/US2016/046858 on Aug. 12, 2016, now Pat. No. 11,174,725.

(51) Int. Cl.
*E21B 47/00* (2012.01)
*E21B 47/092* (2012.01)
(Continued)

(52) U.S. Cl.
CPC .......... *E21B 47/006* (2020.05); *E21B 47/092* (2020.05); *E21B 47/13* (2020.05);
(Continued)

(58) Field of Classification Search
CPC ........... E21B 47/13; E21B 47/00; G01V 3/28; G01V 3/34; G01V 3/38; G01V 99/005
See application file for complete search history.

(56) References Cited

U.S. PATENT DOCUMENTS

| 4,292,589 A | 9/1981 | Bonner |
| 9,625,421 B2 | 4/2017 | Sword |
| (Continued) | | |

FOREIGN PATENT DOCUMENTS

| CN | 104569138 A * | 4/2015 |
| WO | 2015012870 | 1/2015 |
| (Continued) | | |

OTHER PUBLICATIONS

M. Rourke and et al, "Multi-Tubular Corrosion Inspection Using a Pulsed Eddy Current Logging Tool", the International Petroleum Technology Conference, Beijing, China, Mar. 2013, Paper No. IPTC-16645-MS, Published: Mar. 26, 2013 (Year: 2013).*
(Continued)

*Primary Examiner* — Douglas Kay
(74) *Attorney, Agent, or Firm* — John W. Wustenberg; C. Tumey Law Group, PLLC

(57) ABSTRACT

A multi-string monitoring system that includes a processor. The processor obtains electromagnetic (EM) log measurements of a well having at least one inner tubing string and at least one outer tubing string, the measurements including first channel measurements for higher resolution and second channel measurements for deeper penetration. The processor inverts the first channel measurements over a characterization region of the well and the second channel measurements over the characterization region of the well, to obtain an attribute of the at least one outer tubing string and an attribute of the at least one inner tubing string, based, at least in part, on a first plurality of calibration coefficients and a second plurality of calibration coefficients. The processor stores the attribute of the at least one outer tubing string and the attribute of the at least one inner tubing string as a function of position along the well.

18 Claims, 8 Drawing Sheets

(51) Int. Cl.
*E21B 47/13* (2012.01)
*G01V 3/28* (2006.01)
*G01V 3/34* (2006.01)
*G01V 3/38* (2006.01)
*G01V 20/00* (2024.01)

(52) U.S. Cl.
CPC ............... *G01V 3/28* (2013.01); *G01V 3/34* (2013.01); *G01V 3/38* (2013.01); *G01V 20/00* (2024.01)

(56) References Cited

U.S. PATENT DOCUMENTS

| | | | |
|---|---|---|---|
| 9,715,034 | B2* | 7/2017 | Omeragic ............. E21B 47/006 |
| 10,234,591 | B2 | 3/2019 | Wu et al. |
| 10,436,011 | B2* | 10/2019 | Wu ........................ E21B 47/00 |
| 10,443,365 | B2 | 10/2019 | Friesen et al. |
| 10,502,044 | B2 | 12/2019 | Fouda et al. |
| 10,605,720 | B2 | 3/2020 | Amineh et al. |
| 2006/0202700 | A1 | 9/2006 | Barolak et al. |
| 2008/0106260 | A1* | 5/2008 | Rogers ................... B82Y 25/00 324/240 |
| 2009/0195244 | A1 | 8/2009 | Mouget et al. |
| 2009/0302852 | A1 | 12/2009 | Levesque et al. |
| 2010/0134112 | A1 | 6/2010 | Zhang et al. |
| 2010/0263449 | A1 | 10/2010 | Bolshakov et al. |
| 2011/0168446 | A1 | 7/2011 | Lemenager et al. |
| 2012/0095686 | A1* | 4/2012 | Legendre ........... G01N 27/9046 702/6 |
| 2013/0193953 | A1 | 8/2013 | Yarbro et al. |
| 2015/0219601 | A1 | 8/2015 | Davydov et al. |
| 2015/0300991 | A1 | 10/2015 | Sword |
| 2015/0301222 | A1* | 10/2015 | Davydychev .......... G01V 13/00 324/338 |
| 2015/0338541 | A1 | 11/2015 | Nichols et al. |
| 2016/0160629 | A1 | 6/2016 | Donderici et al. |
| 2016/0320769 | A1 | 11/2016 | Deffenbaugh et al. |
| 2017/0038493 | A1* | 2/2017 | Wu ........................ E21B 47/006 |
| 2017/0176629 | A1 | 6/2017 | Omeragic et al. |
| 2017/0261469 | A1* | 9/2017 | Chang .................. E21B 47/006 |
| 2019/0162870 | A1* | 5/2019 | San Martin ........... E21B 47/085 |
| 2019/0226322 | A1 | 7/2019 | Khalaj Amineh et al. |

FOREIGN PATENT DOCUMENTS

| | | | |
|---|---|---|---|
| WO | 2015050840 | 4/2015 | |
| WO | 2015157268 | 10/2015 | |
| WO | 2015157270 | 10/2015 | |
| WO | WO-2015157268 A1 * | 10/2015 | ............ E21B 47/00 |
| WO | 2016007938 | 1/2016 | |
| WO | 2016108909 | 7/2016 | |

OTHER PUBLICATIONS

T. M. Brill and et al, "Quantitative Corrosion Assessment with an EM Casing Inspection Tool", the SPE/DGS Saudi Arabia Section Technical Symposium and Exhibition held in Al-Khobar, Saudi Arabia, May 15-18, 2011 (Year: 2011).*
Abdallah, Dalia, Mohamed Fahim, Khaled Al-Hendi, Mohannad Al-Muhailan, Ram Jawale, Adel Abdulla Al-Khalaf, and M. Sengul. "Casing corrosion measurement to extend asset life." Oilfield Review 22, No. 3 (2013): 18-31 (Year: 2013).*
ISRWO International Search Report and Written Opinion for PCT/US2016/046858 dated May 12, 2017.
Extended European Search Report for Application No. 16912858.4 dated Feb. 6, 2020.
ISRWO International Search Report and Written Opinion for PCT/US2016/046864 dated May 10, 2017.
ISRWO International Search Report and Written Opinion for PCT/US2016/046857 dated May 12, 2017.
Acuna, Irlec Alexandra et al., "Scanning for downhole corrosion," Oilfield Review, Spring 2010, pp. 42-50, vol. 22, No. 1, Schlumberger.
Rourke, Marvin et al., "Multi-tubular corrosion inspection using a pulsed eddy current," IPTC 16645, Mar. 26-28, 2013, Beijing, China.
Notice of Allowance for U.S. Appl. No. 15/533,961 dated Apr. 22, 2021.
Office Action Summary for U.S. Appl. No. 15/533,961 dated Jan. 29, 2021.
Final Office Action Summary for U.S. Appl. No. 15/533,961 dated Oct. 2, 2020.
Office Action Summary for U.S. Appl. No. 15/533,961 dated Apr. 16, 2020.
European Patent Office Extended European Search Report for EPO Application No. 23182236.2 dated Oct. 9, 2023. PDF file. 7 pages.

* cited by examiner

```
┌─────────────────────────────────────────────────────────────────┐
│ Obtain electromagnetic (EM) log measurements of a well having at│  1002
│ least one inner tubing string and at least one outer tubing string│
└─────────────────────────────────────────────────────────────────┘
                              │
                              ▼
┌─────────────────────────────────────────────────────────────────┐
│ Determine a first plurality of calibration coefficients          │  1004
└─────────────────────────────────────────────────────────────────┘
                              │
                              ▼
┌─────────────────────────────────────────────────────────────────┐
│ Independent of determining the first plurality of calibration    │
│ coefficients, determine a second plurality of calibration coefficients│  1006
└─────────────────────────────────────────────────────────────────┘
                              │
                              ▼
┌─────────────────────────────────────────────────────────────────┐
│ Invert the first channel measurements over the characterization  │
│ region of the well and the second channel measurements over the  │  1008
│ characterization region of the well                              │
└─────────────────────────────────────────────────────────────────┘
                              │
                              ▼
┌─────────────────────────────────────────────────────────────────┐
│ Store the attribute of the at least one outer tubing string and the│
│ attribute of the at least one inner tubing string as a function of │  1010
│ position along the well                                          │
└─────────────────────────────────────────────────────────────────┘
```

TOOL AND METHOD TO MAKE HIGH RESOLUTION AND HIGH PENETRATION MEASUREMENT OF CORROSION

BACKGROUND

For oil and gas exploration and production, a network of well installations and other conduits are established by connecting sections of metal tubing together. For example, a well installation may be completed, in part, by lowering multiple sections of metal tubing (e.g., a casing string) into a borehole, and cementing the metal tubing in place. In some well installations, multiple tubing strings are employed (e.g., a concentric multi-string arrangement) to allow for different operations related to well completion, production, or enhanced oil recovery (EOR) options.

Corrosion of metal tubing is an ongoing issue. Efforts to mitigate corrosion include use of corrosion-resistant alloys, coatings, treatments, corrosion transfer, etc. Also, efforts to improve corrosion monitoring are ongoing. For downhole tubing strings, various types of corrosion monitoring tools are available. One type of corrosion detection tool uses electromagnetic (EM) fields to estimate tubing wall thickness or other corrosion indicators. As an example, an EM logging tool may collect EM log data, where the EM log data can be interpreted to correlate a level of flux leakage or EM induction with corrosion. When multiple tubing strings are employed together, correctly managing corrosion detection EM logging tool operations and data interpretation is not a trivial task.

BRIEF DESCRIPTION OF THE DRAWINGS

Accordingly, there are disclosed in the drawings and the following description an electromagnetic (EM) logging tool for multi-string corrosion monitoring and related methods. In the drawings:

FIG. 10 is a flowchart of an illustrative method for monitoring corrosion in a multi-string environment.

Figure 1A:
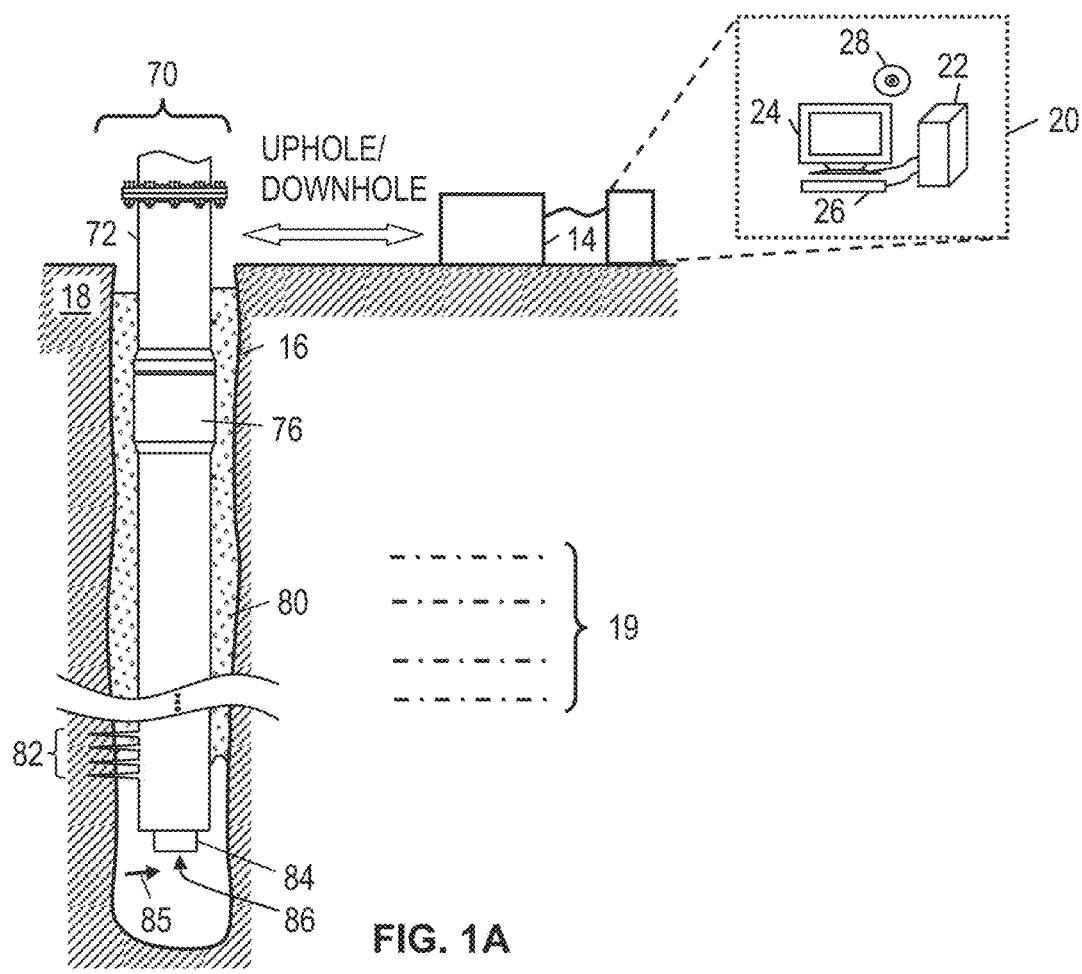
FIGS. 1A and 1B depict an illustrative multi-string corrosion survey environment.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein is an electromagnetic (EM) logging tool for multi-string corrosion monitoring and related methods.

To distinguish between different tubing strings in a multi-string scenario, the EM logging tool may employ different components and/or different operations for each tubing string. For example, the EM logging tool may include different sensor arrays to enable collection of EM log data that corresponds to different sets of tubing strings. Once EM log data corresponding to different sets of tubing strings is collected, it is processed. The processing of EM log data may be performed downhole and/or at earth's surface to derive attributes (e.g., tubing diameter, tubing wall thickness, conductivity, and/or permeability) for each of multiple tubing strings as a function of depth. The derived attributes can further be correlated with one or more types of corrosion and/or with a corrosion index. If corrosion of a particular casing string is determined to exceed a threshold, a corrective action may be performed. Example corrective actions include enhancing, repairing, or replacing at least part of a tubing segment. Additionally or alternatively, a treatment can be applied to reduce the rate of corrosion for at least part of a tubing segment.

Particular method embodiments relate to monitoring corrosion in a multi-string environment. In at least some embodiments, a monitoring method includes obtaining EM log measurements of a well having at least one inner tubing string and at least one outer tubing string, the measurements including first channel measurements for higher resolution and second channel measurements for deeper penetration. The method further includes inverting the first channel measurements over a characterization region of the well and the second channel measurements over the characterization region of the well, to obtain an attribute of the at least one outer tubing string and an attribute of the at least one inner tubing string, based, at least in part, on a first plurality of calibration coefficients and a second plurality of calibration coefficients. The method further includes storing the attribute of the at least one outer tubing string and the attribute of the at least one inner tubing string as a function of position along the well.

A related system includes a processor. The processor obtains EM log measurements of a well having at least one inner tubing string and at least one outer tubing string, the measurements including first channel measurements for higher resolution and second channel measurements for deeper penetration. The processor inverts the first channel measurements over a characterization region of the well and the second channel measurements over the characterization region of the well, to obtain an attribute of the at least one outer tubing string and an attribute of the at least one inner tubing string, based, at least in part, on a first plurality of calibration coefficients and a second plurality of calibration coefficients. The processor stores the attribute of the at least one outer tubing string and the attribute of the at least one inner tubing string as a function of position along the well.

Figure 1B:
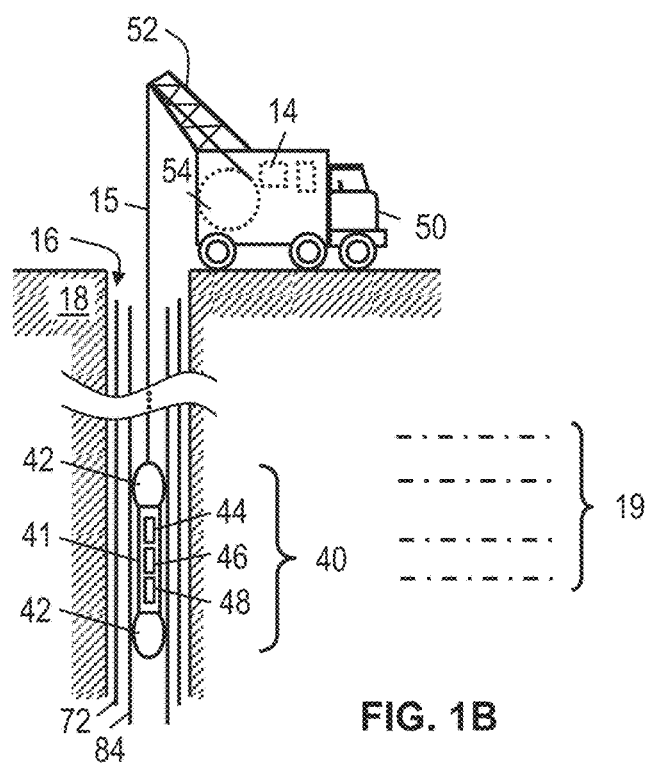

To provide some context for the disclosure, FIGS. 1A and 1B show an illustrative multi-string corrosion survey/monitoring environment. FIG. 1A shows a borehole 16 that penetrates formations 19 of the earth 18. A casing string 72 is positioned in the borehole 16 and secured in place by a cement sheath. Further, a production tubing string 84 has been positioned in an inner bore of the casing string 72.

The casing string 72 and production tubing 84 of well 70 are formed from multiple tubular sections (usually about 30 feet long) connected end-to-end by couplings 76. It should be noted that FIG. 1A is not to scale, and that each tubing string typically includes many such couplings 76. Both the casing string 72 and the production tubing string 84 are typically formed of metal pipe and are subject to corrosion.

The production tubing string 84 defines both central and annular flow paths for fluids. With reference to FIG. 1A, the well 70 corresponds to a production well and the production tubing string is adapted to guide a desired fluid (e.g., oil or gas) from a bottom of the borehole 16 to a surface of the earth 18. Accordingly, perforations 82 may be formed in the casing string 72 or at a bottom of the borehole 16 to facilitate the flow of a fluid 85 from a surrounding formation into the borehole 16 and thence to earth's surface via the central flow path which can be accessed via an opening 86 at the bottom of the production tubing string 84. Note that well configuration of FIG. 1A is illustrative and not limiting on the scope of the disclosure. Other examples of permanent well installations include injection wells and monitoring wells. Further, well 70 may include additional casing or tubing strings to provide additional flow paths to the surface, e.g., from multiple production zones.

FIG. 1A further illustrates a surface interface 14 and/or computer system 20 for collecting data from downhole sensors and perhaps controlling downhole actuators to optimize production. In some embodiments, the surface interface 14 and/or the computer system 20 may be supplied with EM log data collected by an EM logging tool, and tasked with processing the EM log data to determine and monitor tubing string attributes as described herein. In at least some embodiments, the computer system 20 includes a processor 22 that performs the EM log data analysis operations by executing software or instructions obtained from a local or remote non-transitory computer-readable medium 28. The processor 22 may be, for example, a general purpose microprocessor, a microcontroller, a digital signal processor, an application specific integrated circuit, a field programmable gate array, a programmable logic device, a controller, a state machine, gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium. The computer system 20 also may include input device(s) 26 (e.g., a keyboard, mouse, touchpad, etc.) and output device(s) 24 (e.g., a monitor, printer, etc.). Such input device(s) 26 and/or output device(s) 24 provide a user interface that enables an operator to interact with an EM logging tool and/or software executed by the processor 22. For example, the computer system 20 may enable an operator to select analysis options, view collected EM log data, view analysis results, and/or perform other tasks.

The EM logging tool can take various forms, including that of the wireline tool 40 illustrated in FIG. 1B. EM logging tool 40 is positioned within production tubing string 84 and casing string 72, suspended by a cable 15 having conductors and/or optical fibers for conveying power and communication to the EM logging tool 40. The cable 15 may also be used as a communication interface for uphole and/or downhole communications. The cable 15 wraps and unwraps as needed around cable reel 54 when lowering or raising the EM logging tool 40. As shown, the cable reel 54 may be part of a movable logging facility or vehicle 50 having a cable guide 52.

The EM logging tool 40 may include stabilizers 42 on one or more ends (e.g. opposite ends) of main body 41 to centralize the tool 40 within the innermost production tubing string 84. The main body 41 of the EM logging tool 40 includes control electronics 44, transmitter(s) 46, and receiver(s) 48. In operation, transmitter(s) 46 are directed by the control electronics 44 to generate a time-varying EM field whose magnetic flux is guided and modified by the production tubing string 84 and/or tubing string 72. The magnetic flux induces a voltage in receiver(s) 48. The magnetic flux modification provided by the production tubing string 84 and/or tubing string 72 is lossy due to induced eddy currents. The control electronics 44 store the voltages recorded by receiver(s) 48 as a function of tool position to form an EM data log, which may be correlated with geometrical, electrical, and/or magnetic attributes of the production tubing string 84 and/or tubing string 72. Corrosion of the production tubing string 84 and/or tubing string 72 affects their geometrical, electrical, and/or magnetic attributes and can therefore be estimated from analysis of the EM log data. The control electronics 44 may also include a communication interface to transmit the EM data log to earth's surface. Additionally or alternatively, the EM data log obtained by the EM logging tool 40 can be stored and accessed later once the tool 40 reaches earth's surface, as is the case in slickline operations.

In FIG. 1B, the surface interface 14 receives the EM data log via the cable 15 and conveys the EM field measurements to a computer system 20. Again, the interface 14 and/or computer system 20 (e.g., part of the movable logging facility or vehicle 50) may perform various operations such as converting signals from one format to another, storing the EM log data, and/or analyzing the EM log data to determine tubing string attributes.

Figure 2A:
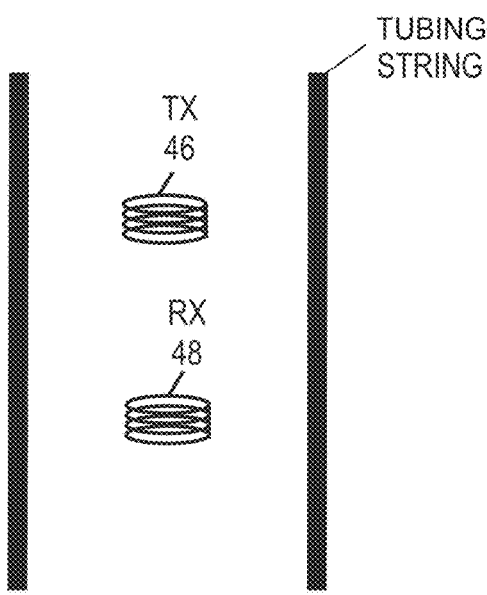
FIGS. 2A and 2B show illustrative transmitter/receiver configurations for an EM logging tool for multi-string corrosion monitoring.
Figure 2B:
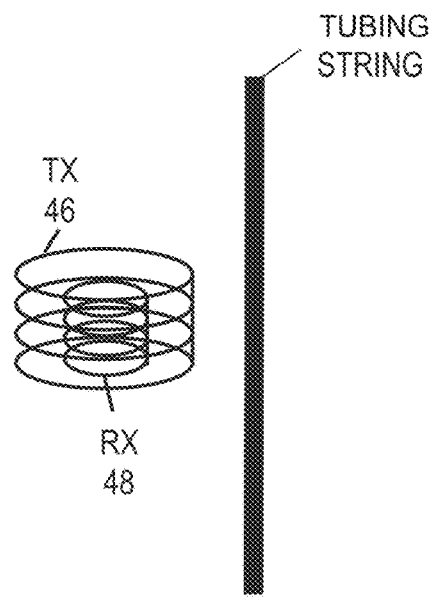

FIGS. 2A and 2B show illustrative transmitter/receiver configurations suitable for an EM logging tool (e.g., tool 40). With reference to FIG. 2A, transmitter 46 and receiver 48 are coaxially positioned within a tubing string (e.g., strings 72 and/or 84) and are separated apart along the tool axis. With reference to FIG. 2B, transmitter 46 and receiver 48 are coaxially positioned within a tubing string (e.g., strings 72 and/or 84) and are collocated. For example, transmitter 46 and receiver 48 may correspond to coils or solenoids, where the receiver 48 is positioned inside the transmitter 46, or vice versa. While only one transmitter 46 and one receiver 48 are illustrated in FIGS. 2A and 2B, it should be understood that EM logging tools such as tool 40 may have a plurality of sensor arrays, where the distance between transmitters 46 and receivers 48 for different sensor arrays may vary. For example, multiple receivers may provide measurements in response to the operation of a given transmitter; conversely, a given receiver may provide measurements in response to the operation of multiple transmitters. Further, the dimensions of the transmitters 46 and receivers 48 may vary for different sensor arrays. Where multiple transmitters are employed, their operation may be frequency multiplexed and/or time multiplexed. In some embodiments, a given transmitter may transmit a multi-frequency signal or a broadband signal. Different frequencies may be chosen to correspond to different tubing diameters. Similarly, where transmit pulses are used, different time delays may correspond to different tubing diameters.

Figure 3:
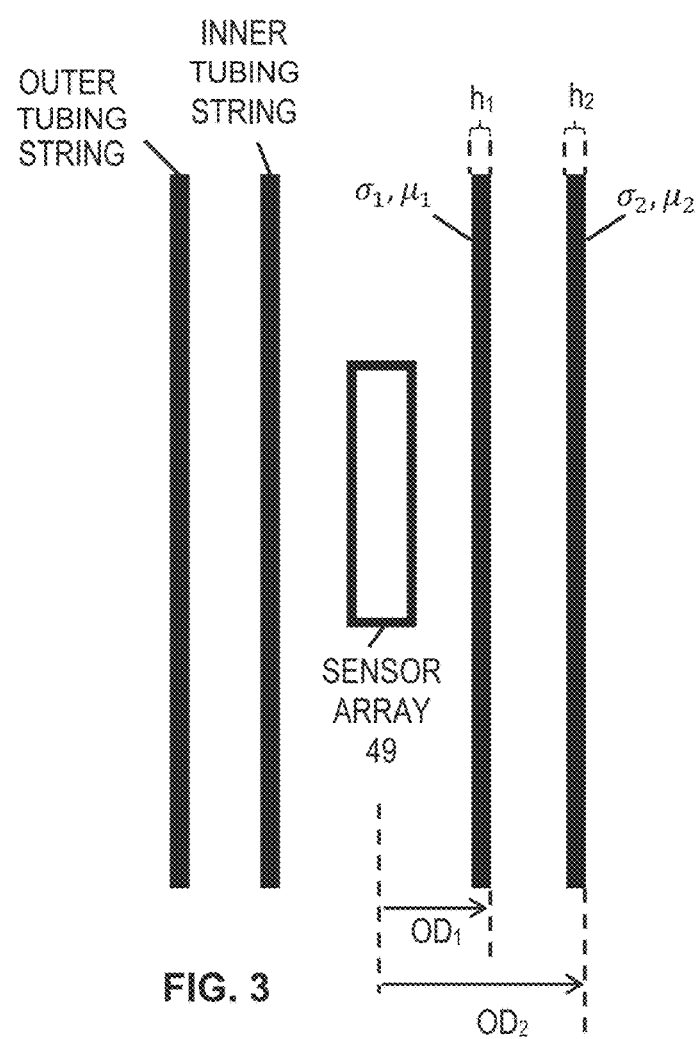
FIG. 3 shows an illustrative multi-string model with related attributes.

FIG. 3 shows an illustrative multi-string model with related attributes. With reference to FIG. 3, a sensor array 49 (e.g., one or more transmitter/receiver arrays) is positioned within two tubing strings (inner and outer tubing strings). The sensing array 49 may be part of an EM logging tool such as tool 40 to enable various attributes of the inner and outer tubing strings to be estimated. In the illustrative survey environment of FIGS. 1A and 1B, the casing string 72 is an outer (casing) string, while the production tubing string 84 is an inner (production tubing) string.

One-dimensional (1D) forward and inversion models may be used to calculate multi-string tubing wall thickness/corrosion attributes. For the two-string tubing model of FIG. 3, tubing wall thickness parameters are assumed uniform along the axial direction. If tubing materials are known, the attributes to be determined for the inner tubing string may include outer diameter ($OD_1$), tubing wall thickness ($h_1$), conductivity ($\sigma_1$), and/or magnetic permeability ($\mu_1$). Similarly, the attributes to be determined for the outer tubing string may include outer diameter ($OD_2$), tubing thickness ($h_2$), conductivity ($\sigma_2$), and/or magnetic permeability ($\mu_2$).

To calculate the tubing wall thickness, a numerical optimization (e.g., a Gauss-Newton method) may be employed. In such case, unknown parameters are adjusted until the misfit error between measurement data and predicted data (computed via forward modeling using estimated parameters) is sufficiently small. This goal can be achieved by iteratively solving a non-linear problem that minimizes the objective cost function:

$$C(X) = \frac{1}{2}[\|e(X)\|^2], \quad (1)$$

where the residual factor is defined as:

$$e(X) = \begin{bmatrix} S_1(X) - m_1 \\ S_2(X) - m_2 \\ \vdots \\ S_j(X) - m_j \\ \vdots \\ S_M(X) - m_M \end{bmatrix}, \quad (2)$$

where $S_j(X)$ is the modeled tool response corresponding to a particular value of tubing attribute vector X. For a single tubing string scenario, X=[OD; h; $\sigma$; $\mu$]. If tubing OD and tubing material are known or predetermined, X is simply equal to tubing thickness h, $m_j$ is the corresponding measured data, and $\|\cdot\|^2$ refers to the L2-norm. If the EM logging tool 40 is operated as a time-domain tool, measured data $m_j$ are usually selected time bins that may correspond to different sets of tubing string diameters. On the other hand, if the EM logging tool 40 is operated at a frequency or multiple frequencies, measured data $m_j$ are collected signals at the frequency or frequencies used. If multiple sensor arrays are employed in the EM logging tool 40, measured data $m_j$ are tool responses (frequency or time-domain) from all of the selected arrays.

The scheme described with reference to Equations (1) and (2) can be implemented straightforwardly by using classical optimization methods. However, it becomes inefficient when the optimization problem is relatively large such as when dealing with a multi-string scenario. Mathematically, as more unknowns are introduced into the inversion model, the final results become more unstable.

Observed from simulation results and theory of EM wave propagation, shorter sensor arrays with higher frequency (or with an earlier time channel) are more sensitive to an inner tubing string (e.g., production tubing string 84). On the other hand, longer sensor arrays with lower frequency (or with a later time channel) are sensitive to both inner and outer strings (e.g., both production tubing string 84 and tubing string 72). These behaviors enable calculation of inner string attributes using a simplified inversion model without taking the outer string into account. After estimating the inner string attributes, the outer string attributes can be computed afterwards in different ways.

As noted earlier, the operation of each sensor array (e.g., sensor array 49) may be varied by frequency-domain or time-domain adjustments. More broadly, EM techniques may be divided into two broad categories: (1) techniques based on magnetic flux leakage (MFL) and (2) techniques based on Eddy current (EC). While MFL techniques are typically more suitable for single-pipe inspections, EC techniques allow for the characterization of multiple pipes (e.g., multiple tubing strings). EC techniques themselves can be divided into two categories: frequency-domain EC techniques and time-domain EC techniques.

According to frequency-domain EC techniques, a transmitter coil (e.g., transmitter 46) is fed by a continuous sinusoidal signal, producing primary fields that illuminate the pipes (e.g., tubing string of FIGS. 2A and 2B, inner tubing string, outer tubing string of FIG. 3). The primary fields produce Eddy currents in the pipes. These Eddy currents, in turn, produce secondary fields that are sensed along with the primary fields in the receiver coils (e.g., receiver 48). As illustrated in FIG. 2A, the receiver coils may be placed at a distance from the transmitter coil. Characterization of the pipes may be performed by measuring and processing these fields.

According to time-domain EC techniques (also referred to as pulsed EC, (PEC)), the transmitter is fed by a pulse. Transient primary fields are produced due to the transition of the pulse from "off" to "on" state or, more commonly, from "on" to "off" state. These transient fields produce Eddy currents in the pipes. The Eddy currents then produce secondary magnetic fields that are measured by a receiver coil (e.g., a separate receiver coil located away from the transmitter, a separate coil co-located with the transmitter, or the same coil that was used as the transmitter).

Characterization of multiple pipes may pose various challenges. As disclosed earlier, longer sensor arrays with lower frequency are sensitive to both inner and outer strings (e.g., both production tubing string 84 and tubing string 72). Accordingly, to acquire a stronger response from the outer pipes (e.g., tubing string 72), a larger transmitter coil may be employed together with larger receiver coils that are placed at longer distances (e.g., 20 inches (50.8 cm) or more) away from the transmitter coil. However, with regard to attributes (e.g., thickness) that are estimated based on measurements from such a sensor array, vertical resolution (e.g., along the depth) is degraded. Therefore, although sensor arrays utilizing longer coils, longer transmitter-receiver distances and/or lower frequencies may be employed to characterize a greater number of pipes (e.g., outer pipes as well as inner pipes), vertical resolution is degraded.

Figure 4:
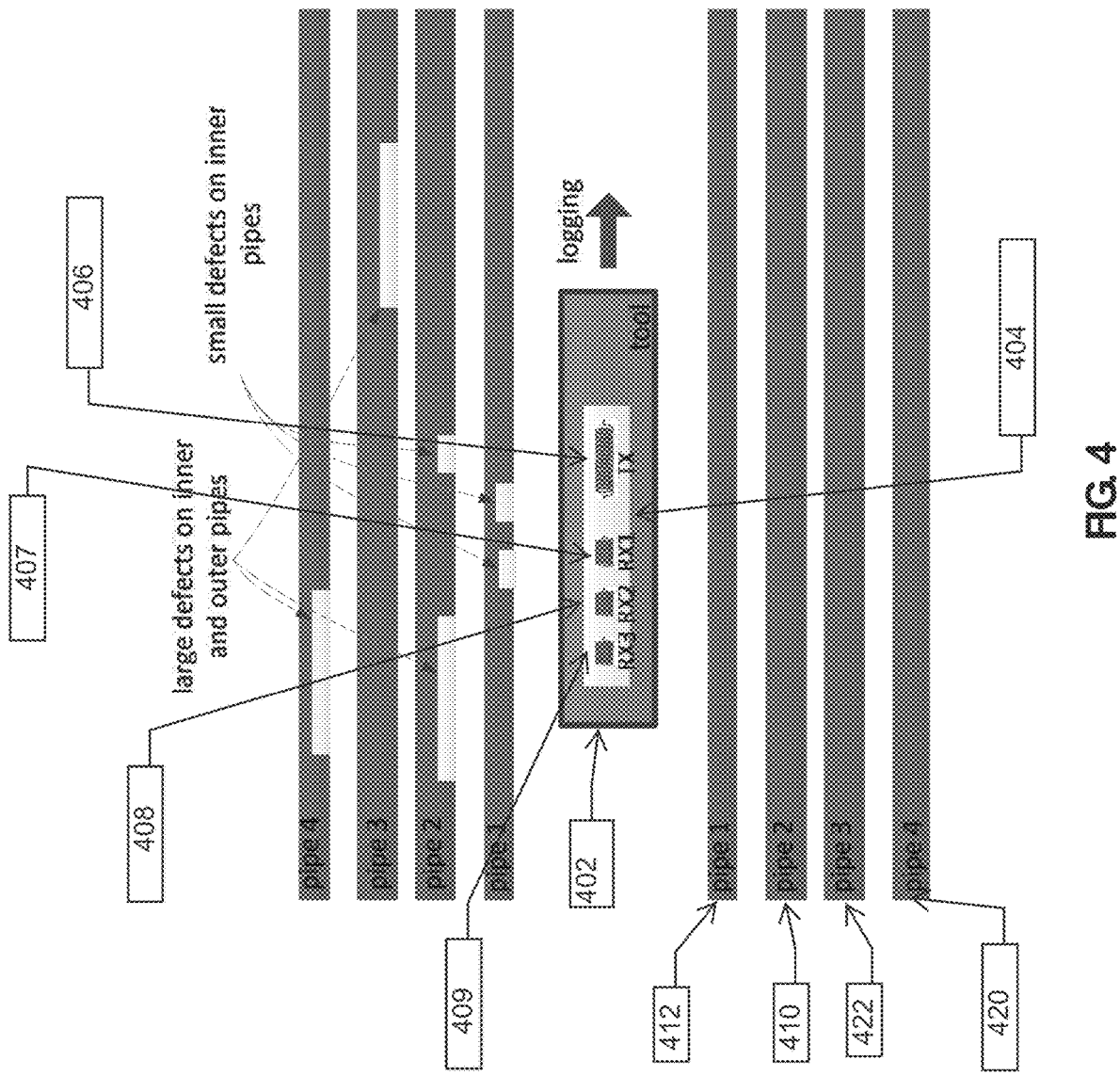
FIG. 4 shows an illustrative sensor array in a multi-string survey environment.

FIG. 4 shows an illustrative sensor array in a multi-string survey environment. With reference to FIG. 4, the depth dimension is illustrated as the direction of logging. The environment includes inner pipes 410, 412 and outer pipes 420, 422. The tool 402 is suitable for detecting defects in the pipes caused by corrosion. With reference to FIG. 4, relatively larger defects (e.g., defects caused by corrosion) are present in the outer pipes 420, 422 and the inner pipe 410. Relatively smaller defects are present in the inner pipes 410, 412. The tool 402 includes a sensor array 404. The sensor array 404 includes a transmitter 406 and receivers 407, 408 and 409 placed at different distances away from the transmitter.

Different degrees of penetration and vertical resolution may be achieved by using the sensor array 404. For example, receivers that are shorter in length and that are placed at shorter distances from the transmitter 406 (e.g., receivers 407, 408), are more suitable for measuring the response due to the inner pipes 410, 412 with better vertical resolution. The receivers that are longer in length and that are placed at longer distances from the transmitter 406 (e.g., receiver 409) are suitable for measuring responses of all pipes (e.g., inner pipes 410, 412 and outer pipes 420, 422) but may be tied to degradation of the vertical resolution.

Figure 5:
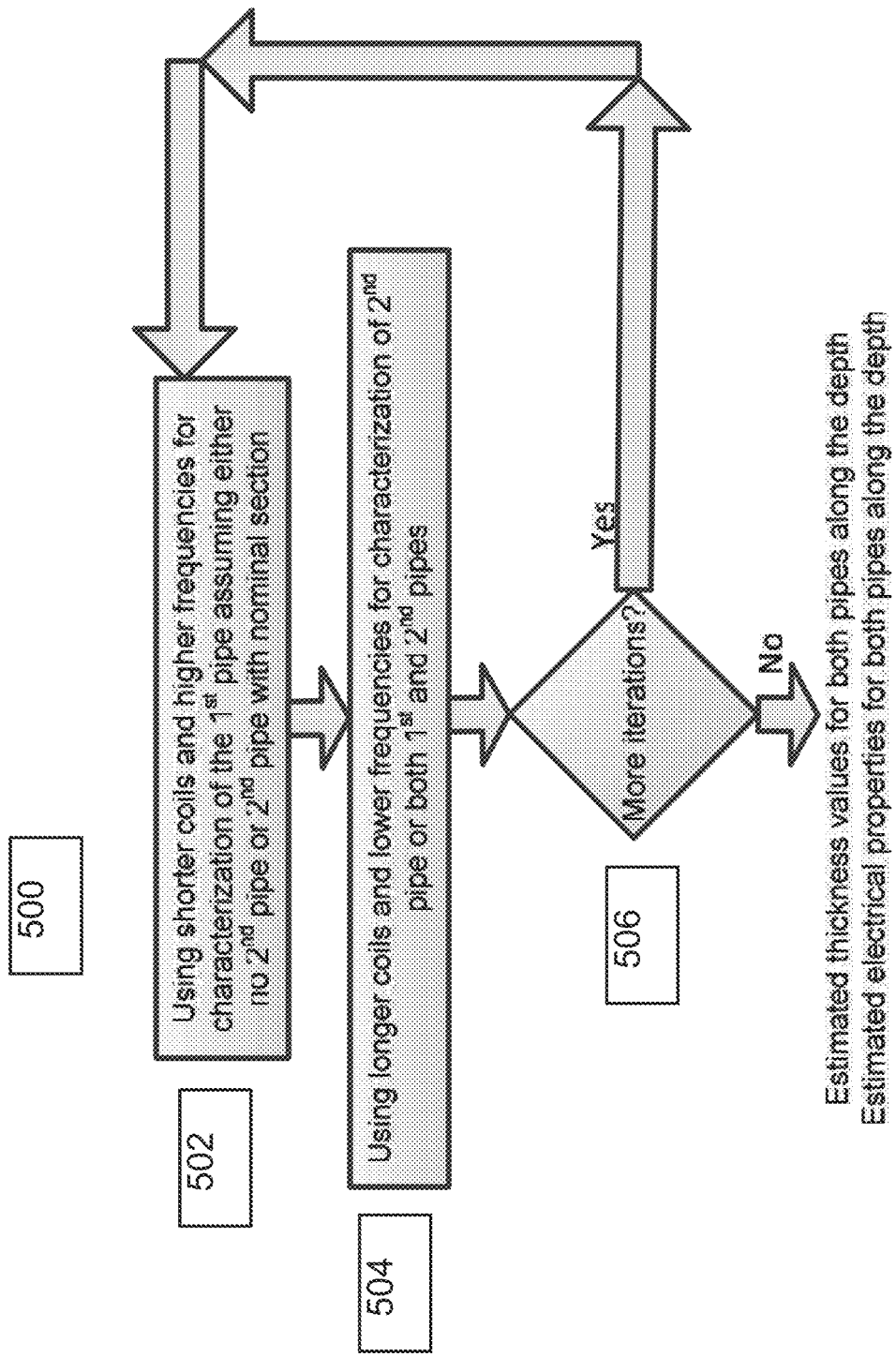
FIG. 5 is a flowchart for an illustrative method to characterize attributes of a multi-string environment.

FIG. 5 is a flowchart 500 for an illustrative method to characterize attributes of a multi-string environment (e.g., using the model of FIG. 4). With reference to FIG. 5, at block 502, shorter-spaced coils (e.g., receivers 407, 408) and perhaps higher frequencies are used to measure responses for characterizing a first pipe (e.g., inner pipe 410). Here, it is assumed that a second pipe (e.g., pipes 412, 420 and 422) is not present. Alternatively, the presence of a second pipe having a nominal thickness is assumed. At block 504, longer-spaced coils (e.g., receiver 409) and perhaps lower frequencies are used to measure responses for characterizing a second pipe (e.g., pipe 412). The attributes derived in block 502 are used together with these longer spacing measurements to determine the attributes of the second pipe. The inversion process may focus solely on determining the attributes of the second pipe (i.e., treating the attributes of the first pipe as fixed) or the inversion process of block 504 may treat the attributes of the first pipe as a starting point and operate to characterize both the first pipe and the second pipe.

As a result of characterizing the first and the second pipes, estimated values of the thicknesses of the pipes are determined along the depth. Further, values of other parameters (e.g., conductivity and/or magnetic permeability) for both pipes may also be determined.

At block 506, it is determined whether additional iterations are performed. For example, the decision to perform additional iterations may be based on an accuracy threshold or a number-of-iterations threshold. If additional iterations are to be performed, then blocks 502 and 504 are repeated. If the environment includes additional pipes (e.g., outer pipes 420, 422), the method may be extended with additional measurements at longer spacings and/or lower frequencies. The previously-solved attributes of the inner pipes are treated as inputs (either fixed or adaptive) to the inversion process as it operates on these additional measurements to calculate the attributes of each additional pipe in turn.

The term "channel" is used herein to refer to measurements for a given depth of penetration. Thus the measurements for a high frequency or early time window from a short-spaced transmitter receiver pair may correspond to a shallow channel; measurements from a low frequency or late time window from a long-spaced transmitter receiver pair may correspond to a deep channel; and other measurements may correspond to intermediate channels. When information from different channels are used together for a 1D model inversion, the attributes are generally either calculated with low resolution and a deep level of penetration, or high resolution and a shallow level of penetration, depending on which channels have a greater degree of contribution to the cost function that is used to estimate the results. This occurs because the 1D nature of the inversion model does not result in both high resolution and deep penetration at the same time. Using a two-dimensional (2D) parameterization may address such concerns. However, a 2D model is usually not a feasible option, due to the level of computational complexity that is involved.

Figure 6:
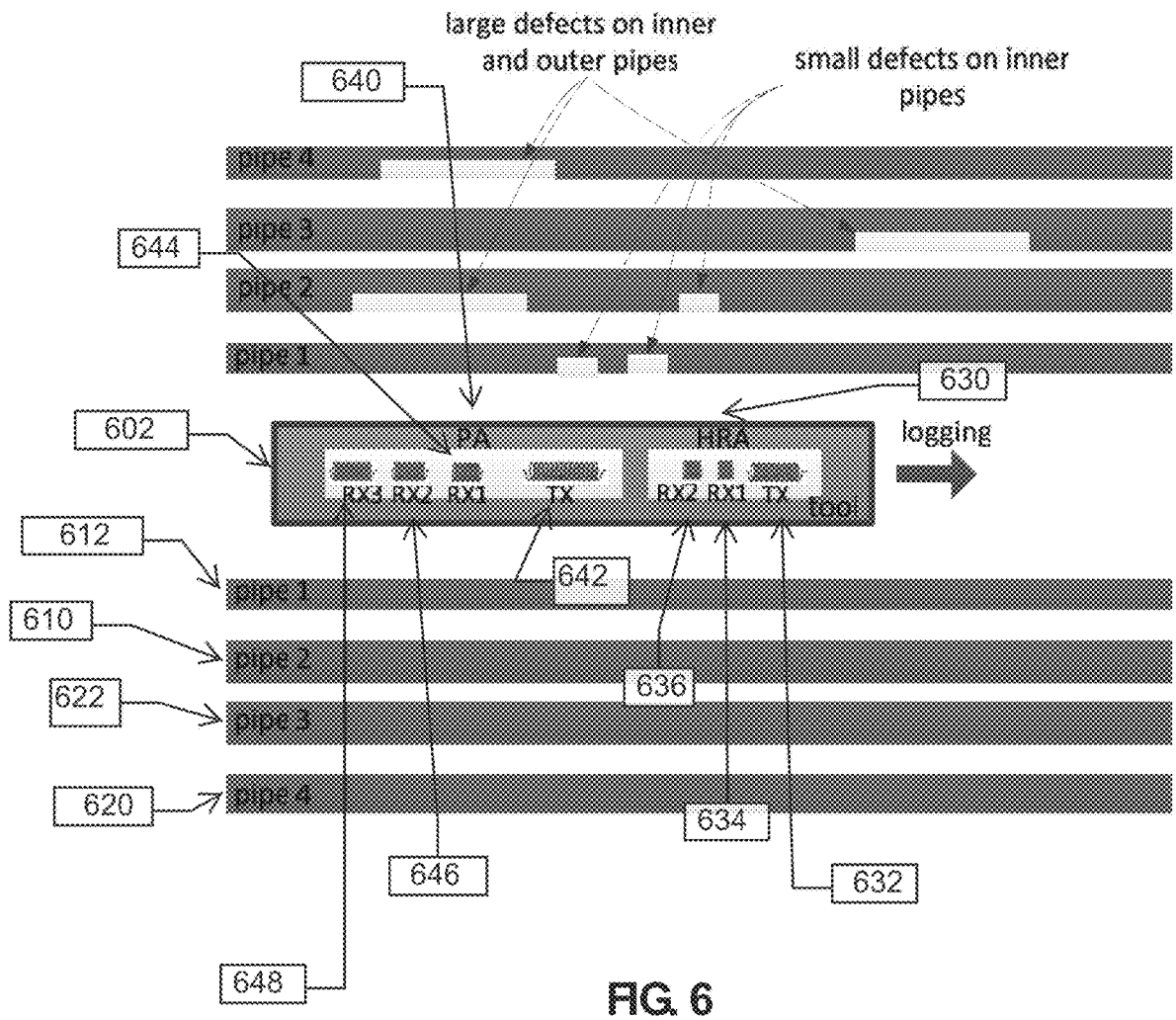
FIG. 6 shows an illustrative EM logging tool configuration.

Accordingly, FIG. 6 provides an EM corrosion detection tool to provide better vertical resolution with respect to inner pipes and a stronger level of penetration to inspect outer pipes. According to at least one embodiment, two stages are employed. A first stage and a second stage utilize respective sensor arrays that are different from each other. For example, a first stage may utilize a high penetration section, or primary array (PA), and a second stage may utilize a high resolution section, or high resolution array (HRA). According to one or more embodiments that will be described in more detail later, inversion algorithms related to these two sections are performed in a particular manner(s). Aspects of the disclosure are directed to integrating results of characterization for the PA and the HRA.

For ease of describing the integration of the inversion algorithms for the two sections, each inversion algorithm may be considered as being broken into two portions: (1) a calibration portion and (2) a characterization portion. According to various embodiments, inversion algorithms for PA and HRA sections are integrated in different ways. For example, in at least one embodiment, the calibration portion of the inversion algorithm for the PA section and the calibration portion of the inversion algorithm for the HRA section are performed separately (e.g., independent of each other). The calibration portions are performed based on measurements taken at locations of the pipes (calibration regions of the wells) that do not have defects (e.g., defects caused by corrosion). In addition to certain electrical parameters (e.g., conductivity and magnetic permeability), calibration coefficients are estimated for the two sections separately, to match forward model responses with the measured responses.

The characterization portions are performed based on measurements taken at locations of the pipes (characterization regions of the wells) that may have defects (e.g., defects caused by corrosion). According to at least one embodiment, the characterization portion of the inversion algorithm for the PA section and the characterization portion of the inversion algorithm for the HRA section are performed in a manner such that the results from the characterization portion for one of the sections (e.g., PA section) may be used to achieve a more accurate characterization for the other section (e.g., HRA section). Alternatively, according to at least one embodiment, a single characterization is performed. The single characterization uses the responses of both the PA section and the HRA section.

FIG. 6 shows an illustrative EM logging tool configuration. The tool 602 is positioned in a multi-string survey environment according to at least one embodiment. With reference to FIG. 6, the depth dimension is illustrated as the direction of logging. The environment includes inner pipes 610, 612 and outer pipes 620, 622. The tool 602 is for detecting defects in the pipes caused by corrosion.

The tool 602 includes two sections. According to at least one embodiment, the two sections are separate from each other. One section includes an HRA 630. The HRA 630 includes a transmitter (e.g., transmitter coil) 632 and receivers (e.g., receiver coils) 634 and 636. Another section includes a PA 640. The PA 640 includes a transmitter (e.g., transmitter coil) 642 and receivers (e.g., receiver coils) 644, 646 and 648.

The HRA 630 is primarily for characterizing the defects on the inner pipes (e.g., inner pipes 610, 612 only). Accordingly, in at least one embodiment, the HRA 630 employs shorter transmitter and receiver coils. For example, the length of the transmitter 632 (along the logging direction) is shorter than the length of the transmitter 642. Also, the respective lengths of the receivers 634, 636 (along the logging direction) are shorter than the respective lengths of the receivers 644, 646 and 648.

In addition (or alternatively), the distances between the transmitter and the receivers in the HRA 630 are shorter than the distances between the transmitter and the receivers in the PA 640. For example, with respect to the logging direction, the distance between the transmitter 632 and its nearest HRA receiver (receiver 634) is shorter than the distance between the transmitter 642 and its nearest PA receiver (receiver 644). As another example, with respect to the logging direction, the distance between the transmitter 632 and its second-nearest HRA receiver (receiver 636) is shorter than the distance between the transmitter 642 and its second-nearest PA receiver (receiver 646).

In addition (or alternatively), the HRA uses higher frequencies than the PA uses.

The responses of the HRA are processed to achieve high vertical resolution in the characterization of inner pipes (inner pipes 610, 612). As described earlier, the PA employs longer transmitter and receiver coils, longer distances between transmitter and receivers, and/or lower frequencies to characterize the defects on both inner pipes and outer pipes (e.g., outer pipes 620, 622). However, processing PA responses may result in lower vertical resolution in the characterization of inner pipes.

With respect to at least one embodiment, the processing of PA responses and HRA responses will be described. The processing improves the vertical resolution in the characterization (e.g., thickness estimation) of inner pipes by, for example, combining inversion algorithms and/or results obtained from responses of the PA and of the HRA. Before such processing is described in more detail, an inversion scheme that may be used as a basis for multiple-pipe inspection will first be described.

Figure 7:
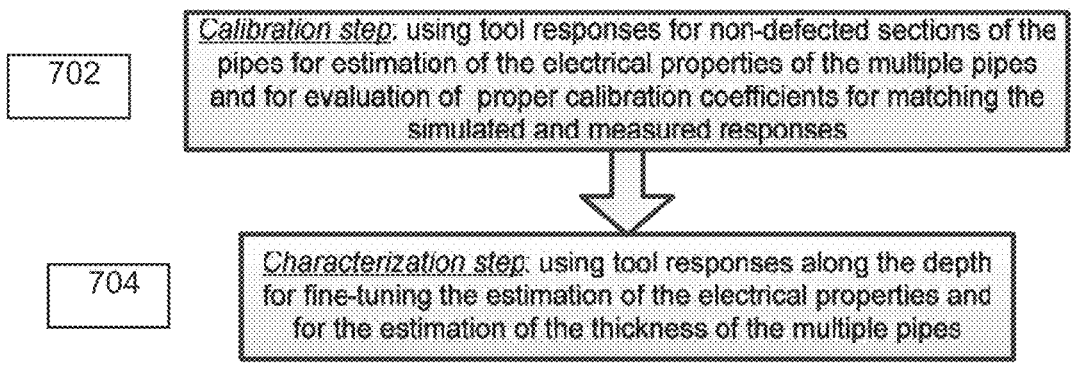
FIG. 7 is a flowchart of an illustrative two-stage inversion approach.

FIG. 7 is a flowchart of an illustrative two-stage inversion approach. The approach will be described with reference to a frequency-domain EC tool for a multiple-pipe inspection.

For purposes of reducing computational complexity, a 1D model is employed. With reference to FIG. 7, calibration is performed at block 702. In more detail, responses of a tool (e.g., PA responses, or HRA responses) are employed to estimate attributes of multiple pipes. Typically, the responses correspond to a section(s) of the pipes (a calibration region of the well) that lacks defects (e.g., defects caused by corrosion). Inversion algorithms may be used to estimate the desired parameters. Simulated responses of the pipes at such sections are also produced. Calibration coefficients are determined for matching the simulated and measured responses—e.g., to bring a simulated response and a corresponding measured response closer to each other. Calibration coefficients may vary across different receivers (e.g., receivers 634, 636, 644, 646, 648) and across different frequencies. Also, separate calibration coefficients may be computed for matching amplitudes and phases of the simulated and measured responses.

At block 704, characterization is performed. The characterization is performed based on measurements taken at locations of the pipes (characterization regions of the wells) that may have defects (e.g., defects caused by corrosion). In more detail, tool responses along the depth are employed for estimating attributes (e.g., thickness) of the multiple pipes. In addition, because electrical properties of the pipes (in particular, magnetic permeability) may change along the depth, electrical properties that were estimated earlier in the calibration of block 702 may be fine-tuned. Again, inversion algorithms may be used to estimate the desired attributes.

Various embodiments will now be described in more detail with reference back to the tool 602 of FIG. 6. At least one embodiment is based, at least in part, on a concept that the more information that is acquired for inversion processing, the more accurate the estimated parameters are. According to at least some embodiments, inversion algorithms for a sensor array (e.g., HRA 630) and another sensor array (e.g., PA 640) are combined. This is based, at least in part, on the concept that one or more particular parameters (e.g., electrical properties) are common parameters that are to be estimated in both PA and HRA inversion algorithms.

Figure 8:
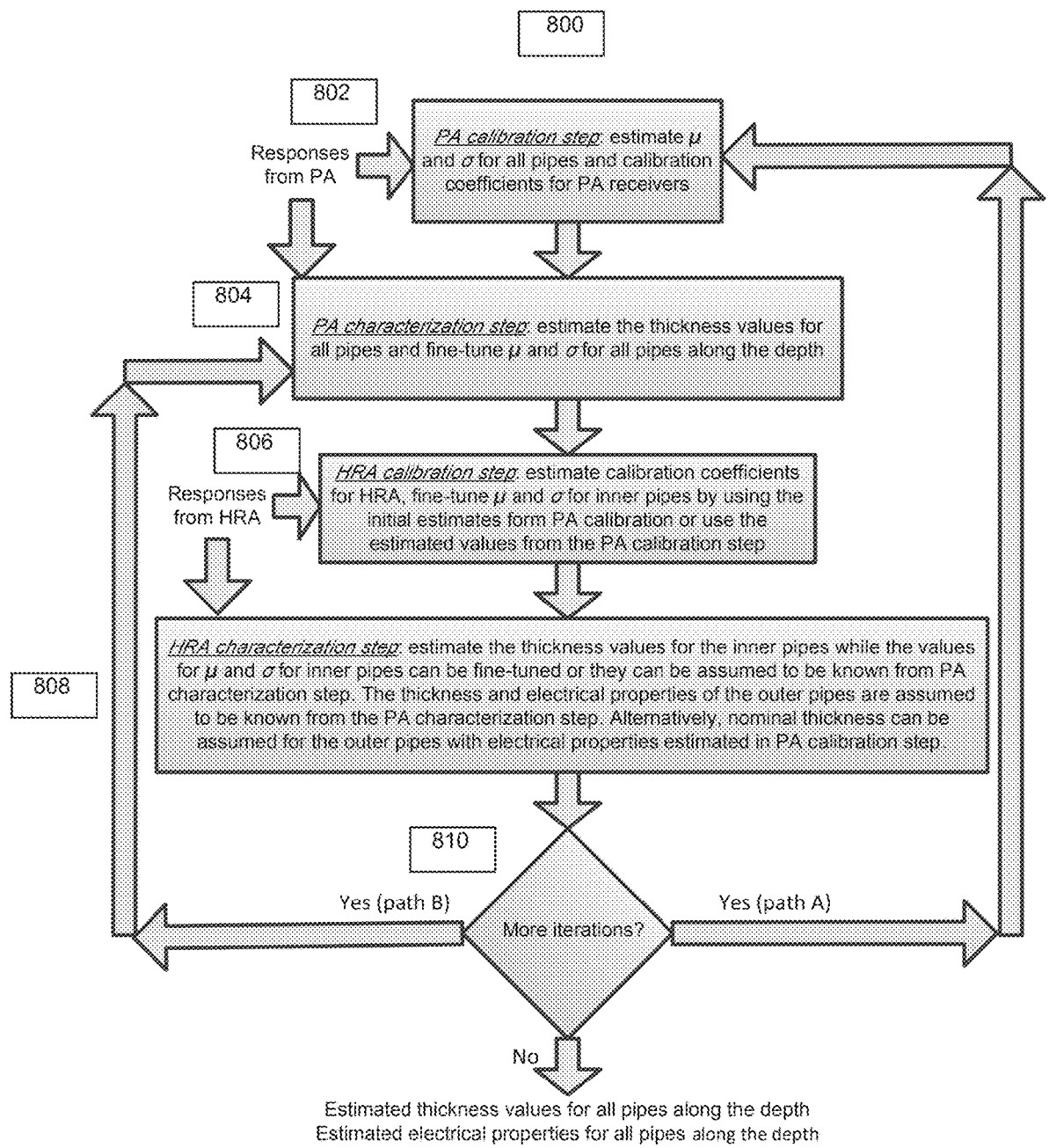
FIG. 8 is a flowchart of a first illustrative method for processing responses of a logging tool.

FIG. 8 is a flowchart 800 of a first illustrative method for processing responses of a logging tool. In the flowchart 800, responses measured by a PA (e.g., PA 640) are employed to implement the corresponding calibration (see, e.g., block 702 of FIG. 7) and characterization (see, e.g., block 704 of FIG. 7). Responses measured by the PA are employed before responses measured by an HRA (e.g., HRA 630) are employed. Such a sequence may achieve a better level of performance because PA 640 has a greater number of receivers than HRA 630 and can, therefore, offer a greater number of data points. However, it is understood that it is not necessary that the number of receivers in the PA be larger than the number of receivers in the HRA.

At block 802, calibration for the PA (e.g., PA 640) is performed. The calibration is based on responses from the PA. Values of calibration coefficients for PA receivers (e.g., receivers 644, 646 and 648) are determined. In addition, values of electrical properties (e.g., magnetic permeability $\mu$ and conductivity $\sigma$) of multiple pipes (e.g., inner pipes 610, 612 and outer pipes 620, 622) may be estimated.

At block 804, characterization for the PA is performed along the depth dimension. In more detail, attributes and/or properties of multiple pipes (e.g., inner pipes 610, 612 and outer pipes 620, 622) are estimated. For example, the thickness values for all pipes may be determined. The determination of the thickness values may be performed using inversions based on the calibration coefficients determined at block 802. In addition, values of electrical properties that were estimated at block 802 may be fine-tuned. As will be described in more detail below, the estimated and/or fine-tuned values of the electrical properties may be used when performing calibration and/or characterization of the HRA.

At block 806, calibration for the HRA (e.g., HRA 630) is performed. The calibration is based on responses from the HRA. Values of calibration coefficients for HRA receivers (e.g., receivers 634 and 636) are estimated. In addition, values of electrical properties (e.g., magnetic permeability $\mu$ and conductivity $\sigma$) of inner pipes (e.g., inner pipes 610, 612) may be estimated. In this regard, the values that were estimated at block 802 may be used (e.g., adopted) as the estimated values. Alternatively, the values that were estimated at block 802 may be used as initial estimates that are fine-tuned. As such, parameters that were estimated based on PA responses may be used (e.g., to apply proper regularization terms or constraints) in the inversion process using HRA responses. The use of such parameters may help to produce a better characterization of the inner pipes when using HRA responses for high-resolution estimation of the thickness of the inner pipes.

At block 808, characterization for the HRA is performed along the depth dimension. In more detail, attributes and/or properties of inner pipes (e.g., inner pipes 610, 612) are estimated. For example, the thickness values for the inner pipes may be determined. The determination of the thickness values may be performed using inversions based on the calibration coefficients determined at block 806. In addition, values of electrical properties that were estimated at block 802 may be fine-tuned. Alternatively, values of electrical properties that were estimated earlier (see, e.g., block 804) may be adopted.

Regarding the outer pipes (e.g., outer pipes 620, 622), the thicknesses and electrical properties of the outer pipes may be assumed to be known based on earlier estimates (see, e.g., block 804). Alternatively, it may be assumed that the outer pipes have nominal thickness values and values of electrical properties that were estimated earlier (see, e.g., blocks 802, 804).

At block 810, it is determined whether additional iterations are performed. For example, the decision to perform additional iterations may be based on an accuracy threshold or a number of iterations threshold. If additional iterations are to be performed, then the operations of certain blocks in the flowchart 800 are repeated. Accordingly, estimations from the inversions on PA and HRA responses at a particular iteration may be used, for example, to refine the estimations for thickness and electrical properties of the pipes at a next iteration. According to at least one embodiment, the estimated parameters from each approach can be used as initial values or can be used to apply proper regularization terms or optimization constraints to improve the estimation process in the next iteration.

According to at least one embodiment, blocks 802, 804, 806 and 808 are repeated (see path A). According to at least another embodiment, blocks 804, 806 and 808 are repeated (see path B). Regarding path B, the operations of block 802 (calibration for the PA) are not repeated. Path B may be selected over path A when, for example, conserving computational resources is desired and/or a lesser degree of focus on the outer pipes is desired.

In the flowchart 800, the calibration for the PA (see block 802) and the calibration for the HRA (see block 806) are implemented separately of each other. Such an implementation allows, for example, for separate calibration coefficients (e.g., separate sets of calibration coefficients) to be estimated for each sensor array. The separate calibration coefficients may account for factors such as the differing transmitter lengths in the arrays and the presence of potentially different core material (e.g., in the transmitter coils and/or receiver coils).

In at least one other embodiment, a single characterization (e.g., concurrent characterization) is performed based on the acquired responses from the PA and the HRA.

Figure 9:
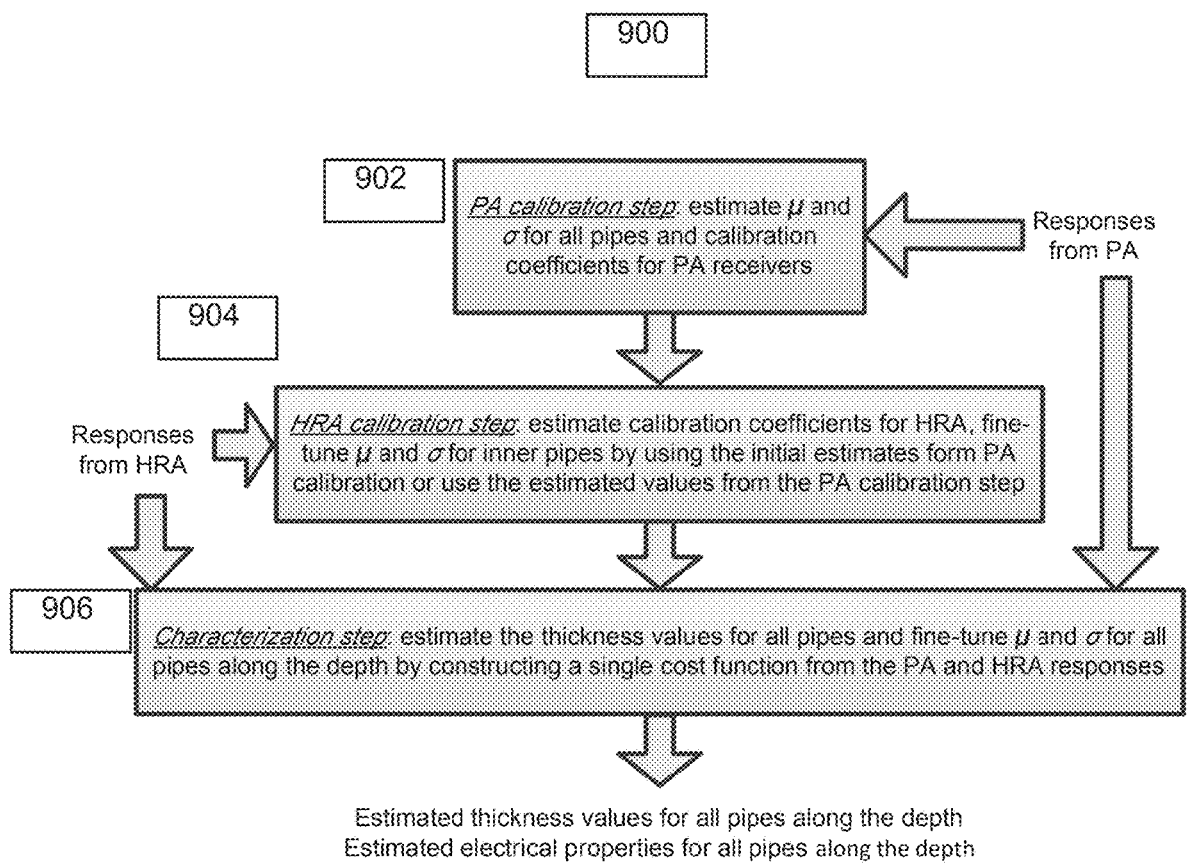
FIG. 9 is a flowchart of a second illustrative method for processing responses of a logging tool.

FIG. 9 is a flowchart 900 of a second illustrative method for processing responses of a logging tool. At block 902, calibration for the PA (e.g., PA 640) is performed. The calibration is based on responses from the PA. Values of calibration coefficients for PA receivers (e.g., receivers 644, 646 and 648) are determined. In addition, values of electrical properties (e.g., magnetic permeability μ and conductivity σ) of multiple pipes (e.g., inner pipes 610, 612 and outer pipes 620, 622) may be estimated.

At block 904, calibration for the HRA (e.g., HRA 630) is performed. The calibration is based on responses from the HRA. Values of calibration coefficients for HRA receivers (e.g., receivers 634 and 636) are estimated. In addition, values of electrical properties (e.g., magnetic permeability μ and conductivity σ) of inner pipes (e.g., inner pipes 610, 612) may be estimated. In this regard, the values that were estimated at block 902 may be used (e.g., adopted) as the estimated values. Alternatively, the values that were estimated at block 902 may be used as initial estimates that are fine-tuned.

After the calibration of block 902 and the calibration of block 904 are performed, a single characterization is performed for the PA and the HRA along the depth dimension at block 906. In more detail, attributes and/or properties of multiple pipes (e.g., inner pipes 610, 612 and outer pipes 620, 622) are estimated. For example, the thickness values for all pipes may be determined. The determination of the thickness values may be performed using inversions based on the calibration coefficients determined at blocks 902 and 904. In addition, values of electrical properties that were estimated at blocks 902 and 904 may be fine-tuned.

According to one or more embodiments, a cost function is utilized in the characterization of block 906. The cost function may be constructed from the PA and HRA responses. For example, a cost function may be constructed based on differences between the responses acquired from the PA and HRA sections and the corresponding forward models or library responses. This cost function is then minimized to estimate values of the electrical properties and the thicknesses for multiple pipes (e.g., all pipes including inner pipes 610, 612 and outer pipes 620, 622). The inclusion of the HRA response in the cost function leads to (e.g., provides a basis for) determination of higher-resolution thickness estimations for the inner pipes. Also, the inclusion of the PA response in the cost function leads to determination of the thickness estimation of the outer pipes.

Regarding the cost function, the contribution of the responses from the HRA may be boosted using suitable weighting coefficients for estimation of the electrical properties and thicknesses of the inner pipes, and the contribution of the responses from the PA may be boosted using suitable weighting coefficients for estimation of the electrical properties and thicknesses of the outer pipes. An example of a cost function is provided in Equation (3) below.

$$c(e^{all}, t^{all}) = w^{PA} c^{PA}(f^{PA}, M^{PA}, e^{all}, t^{all}, d^{all}) + w^{HRA} c^{HRA}(f^{HRA}, M^{HRA}, e^{in}, t^{in}, d^{in}) \qquad (3)$$

In the above Equation (3), $e^{in}$, $t^{in}$ and $d^{in}$ denote the vectors containing the electrical properties, the thicknesses, and the diameters of the inner pipes, respectively, $e^{all}$, $t^{all}$ and $d^{all}$ denote the vectors containing the electrical properties, the thicknesses, and the diameters of all pipes, respectively, $w^{PA}$ and $w^{HRA}$ denote the vectors of weighting coefficients corresponding to the primary array and high resolution array terms in the cost function, respectively, $f^{PA}$ and $f^{HRA}$ denote the vectors of forward model responses or library responses used for the inversion of the primary array and high resolution array, respectively, and $M^{PA}$ and $M^{HRA}$ denote the vectors of the measured responses for the primary array and high resolution array, respectively.

FIG. 10 shows a flowchart of an illustrative method 1000 for monitoring corrosion in a multi-string environment.

At block 1002, EM log measurements of a well having at least one inner tubing string (e.g., inner tubing string of FIG. 3) and at least one outer tubing string (e.g., outer tubing string of FIG. 3) are obtained. The measurements include first channel measurements for higher resolution (e.g., measurements by HRA 630) and second channel measurements for deeper penetration (e.g., measurements by PA 640).

At block 1004, a first plurality of calibration coefficients may be determined. In at least one embodiment, the first plurality of calibration coefficients are determined by comparing first channel model predictions with the first channel measurements over the calibration region of the well (see, e.g., the calibration of block 806, the calibration of block 904).

At block 1006, independent of determining the first plurality of calibration coefficients, a second plurality of calibration coefficients may be determined. In at least one embodiment, the second plurality of calibration coefficients are determined by comparing second channel model predictions with the second channel measurements over the calibration region of the well (see, e.g., the calibration of block 802, the calibration of block 902).

At block 1008, the first channel measurements over the characterization region of the well and the second channel measurements over the characterization region of the well are inverted (see, e.g., the respective characterizations of blocks 804 and 808, or the characterization of block 906). Accordingly, an attribute of the at least one outer tubing string and an attribute of the at least one inner tubing string are obtained, based, at least in part, on the first plurality of calibration coefficients and the second plurality of calibration coefficients. According to at least one embodiment, the inversion of block 1008 involves using a common cost function (see, e.g., Equation (3)) and a common inversion process.

At block 1010, the attribute of the at least one outer tubing string and the attribute of the at least one inner tubing string are stored as a function of position along the well. For example, the attributes are stored at medium 28.

According to various aspects of this disclosure, a corrosion detection tool and methods of detecting corrosion have been described. According to such aspects, characterization of multiple pipes may be performed, with the capability of characterizing inner pipes with a higher degree of accuracy and higher resolution. A more accurate characterization of the inner pipes may, in turn, lead to more accurate characterization results for the outer pipes as well. In general, this allows for better interpretation of the integrity of multiple tubings which, in turn, may lead to significant financial advantages during the production process.

Various embodiments disclosed herein involve combining responses of a high resolution array with responses of a primary array to achieve good vertical resolution for inner pipes and overall high accuracy in characterization of multiple pipes.

Various embodiments disclosed herein feature one or more of the following aspects: (i) characterization of one or more pipes (e.g., all inner and outer pipes) is performed with a primary array that employs larger coils and lower frequencies, (ii) characterization of one or more inner pipes is performed with better vertical resolution and accuracy with a high resolution array section, (iii) characterization of both inner pipes and outer pipes can be refined iteratively to provide more accurate characterization results, and/or (iv) characterization of the multiple pipes with better accuracy ultimately leads to a significant positive impact on a production process.

Embodiments disclosed herein include:

A: A multi-string monitoring system that includes a processor. The processor obtains EM log measurements of a well having at least one inner tubing string and at least one outer tubing string, the measurements including first channel measurements for higher resolution and second channel measurements for deeper penetration. The processor inverts the first channel measurements over a characterization region of the well and the second channel measurements over the characterization region of the well, to obtain an attribute of the at least one outer tubing string and an attribute of the at least one inner tubing string, based, at least in part, on a first plurality of calibration coefficients and a second plurality of calibration coefficients. The processor stores the attribute of the at least one outer tubing string and the attribute of the at least one inner tubing string as a function of position along the well.

B: A multi-string monitoring method that includes obtaining EM log measurements of a well having at least one inner tubing string and at least one outer tubing string, the measurements including first channel measurements for higher resolution and second channel measurements for deeper penetration. The method further includes inverting the first channel measurements over a characterization region of the well and the second channel measurements over the characterization region of the well, to obtain an attribute of the at least one outer tubing string and an attribute of the at least one inner tubing string, based, at least in part, on a first plurality of calibration coefficients and a second plurality of calibration coefficients. The method further includes storing the attribute of the at least one outer tubing string and the attribute of the at least one inner tubing string as a function of position along the well.

Each of the embodiments, A and B, may have one or more of the following additional elements in any combination. Element 1: wherein: the measurements cover a calibration region of the well and the characterization region of the well; and the processor further: determines the first plurality of calibration coefficients by comparing first channel model predictions with the first channel measurements over the calibration region of the well; and independent of determining the first plurality of calibration coefficients, determines the second plurality of calibration coefficients by comparing second channel model predictions with the second channel measurements over the calibration region of the well. Element 2: wherein: the first channel measurements are obtained using a first EM channel; the second channel measurements are obtained using a second EM channel; and a frequency of the second EM channel is lower than a frequency of the first EM channel. Element 3: further comprising: a first sensor array employed to collect the first channel measurements, the first sensor array comprising a receiver coil; and a second sensor array employed to collect the second channel measurements, the second sensor array comprising a receiver coil, wherein a length of the second sensor array receiver coil is longer than a length of the first sensor array receiver coil with respect to the logging direction. Element 4: wherein: the first sensor array further comprises a transmitter coil; the second sensor array further comprises a transmitter coil; and a length of the second sensor array transmitter coil is longer than a length of the first sensor array transmitter coil with respect to the logging direction. Element 5: wherein a spacing between the second sensor array transmitter coil and the second sensor array receiver coil is longer than a spacing between the first sensor array transmitter coil and the first sensor array receiver coil with respect to the logging direction. Element 6: wherein a number of receiver coils in the second sensor array is larger than a number of receiver coils in the first sensor array. Element 7: wherein: the first channel measurements facilitate characterization of the at least one inner tubing string at a higher resolution along the logging direction than the second channel measurements; and the second channel measurements facilitate characterization of the at least one inner tubing string and the at least one outer tubing string at a deeper level of penetration than the first channel measurements. Element 8: wherein the processor inverts by concurrently inverting the first channel measurements over the characterization region of the well and the second channel measurements over the characterization region of the well. Element 9: wherein the processor concurrently inverts the first channel measurements over the characterization region of the well and the second channel measurements over the characterization region of the well using a common cost function and a common inversion process.

Element 10: wherein: the measurements cover a calibration region of the well and the characterization region of the well; and the method further comprises: determining the first plurality of calibration coefficients by comparing first channel model predictions with the first channel measurements over the calibration region of the well; and independent of determining the first plurality of calibration coefficients, determining the second plurality of calibration coefficients by comparing second channel model predictions with the second channel measurements over the calibration region of the well. Element 11: wherein: the first channel measurements are obtained using a first EM channel; the second channel measurements are obtained using a second EM channel; and a frequency of the second EM channel is lower than a frequency of the first EM channel. Element 12: wherein: obtaining the EM log measurements comprises employing a first sensor array to collect the first channel measurements and employing a second sensor array to collect the second channel measurements, the first sensor array comprising a receiver coil, and the second sensor array comprising a receiver coil; and a length of the second sensor array receiver coil is longer than a length of the first sensor array receiver coil with respect to a logging direction. Element 13: wherein: the first sensor array further comprises a transmitter coil; the second sensor array further comprises a transmitter coil; and a length of the second sensor array transmitter coil is longer than a length of the first sensor array transmitter coil with respect to the logging direction. Element 14: wherein a spacing between the second sensor array transmitter coil and the second sensor array receiver coil is longer than a spacing between the first sensor array transmitter coil and the first sensor array receiver coil with respect to the logging direction. Element 15: wherein a number of receiver coils in the second sensor array is larger than a number of receiver coils in the first sensor array. Element 16: wherein: the first channel measurements facilitate characterization of the at least one inner tubing string at a higher resolution along the logging direction than the second channel measurements; and the second channel measurements facilitate characterization of the at least one inner tubing string and the at least one outer tubing string at a deeper level of penetration than the first channel measurements. Element 17: wherein the inverting comprises concurrently inverting the first channel measurements over the characterization region of the well and the second channel measurements over the characterization region of the well. Element 18: wherein concurrently inverting the first channel measurements over the characterization region of the well and the second channel measurements over the characterization region of the well comprises using a common cost function and a common inversion process.

Numerous other variations and modifications will become apparent to those skilled in the art once the above disclosure is fully appreciated. For example, in some embodiments, the order of the processing operations described herein may vary and/or be performed in parallel. It is intended that the following claims be interpreted to embrace all such variations and modifications where applicable.

What is claimed is:

1. A multi-string corrosion monitoring method that comprises:
   transmitting a primary field of at least one frequency from a transmitter disposed on an electromagnetic (EM) logging tool;
   measuring an electromagnetic field generated by at least a first eddy current from the primary field in at least one inner tubing string with the EM logging tool;
   measuring an electromagnetic field generated by at least a second eddy current from the primary field in at least one outer tubing string with the EM logging tool; and
   characterizing one or more attributes on the at least one inner tubing string or the at least one outer tubing string based at least in part on a cost function, wherein the cost function implements a first weighting coefficient for the first electromagnetic field, wherein the first weighting coefficient is based at least on the inner tubing string and a second weighting coefficient for the second electromagnetic field, wherein the second weighting coefficient is based at least on the outer tubing string.

2. The method of claim 1, wherein the one or more attributes include a casing section, a casing joint, or a corrosion.

3. The method of claim 1, further comprising calibrating the characterization of the one or more attributes with at least the cost function.

4. The method of claim 3, wherein the cost function is a nonlinear model.

5. The method of claim 4, wherein the nonliar model includes interference from one or more pipe strings.

6. The method of claim 3, wherein the calibration is performed for a primary array.

7. The method of claim 6, further comprising forming a calibration coefficient for the primary array that includes one or more electrical properties of the at least one inner tubing string or the at least one outer tubing string.

8. The method of claim 3, wherein the calibration is performed for a high-resolution array.

9. The method of claim 8, further comprising forming a calibration coefficient for the high-resolution array that includes one or more electrical properties of the at least one inner tubing string or the at least one outer tubing string.

10. A system for multi-string corrosion monitoring method that comprises:
    an electromagnetic (EM) logging tool comprising:
    a transmitter coil configured to transmit two or more primary fields of at least two or more frequencies and form at least a first eddy current in at least one inner tubing string and form at least a second eddy current in at least one outer tubing string;
    a receiver coil configured to measure the electromagnetic fields generated by the first eddy current and the second eddy current with the EM logging tool; and
    a computer system configured to characterize one or more attributes on the at least one inner tubing string or the at least one outer tubing string based at least in part on a cost function, wherein the cost function implements a first weighting coefficient for the first eddy current and a second weighting coefficient for the second eddy current, wherein the first weighting coefficient is based at least on the inner tubing string and the second weighting coefficient is based at least on the outer tubing string.

11. The system of claim 10, wherein the one or more attributes include a casing section, a casing joint, or a corrosion.

12. The system of claim 10, wherein the computer system is further configured to calibrate the characterization of the one or more attributes.

13. The system of claim 3, wherein the cost function is a nonlinear model.

14. The system of claim 13, wherein the nonliar model includes interference from one or more pipe strings.

15. The system of claim 12, wherein the calibration is performed for a primary array.

16. The system of claim 15, wherein the computer system is further configured to form a calibration coefficient for the primary array that includes one or more electrical properties of the at least one inner tubing string or the at least one outer tubing string.

17. The system of claim 12, wherein the calibration is performed for a high-resolution array.

18. The system of claim 17, wherein the computer system is further configured to form a calibration coefficient for the high-resolution array that includes one or more electrical properties of the at least one inner tubing string or the at least one outer tubing string.

* * * * *